(12) United States Patent
Fischer

(10) Patent No.: US 8,526,349 B2
(45) Date of Patent: Sep. 3, 2013

(54) SERIAL CLEAR TO SEND (CTS) TO SELF (CTS2SELF) MESSAGING PROCEDURE

(75) Inventor: Mathew J. Fischer, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 975 days.

(21) Appl. No.: 11/936,597

(22) Filed: Nov. 7, 2007

(65) Prior Publication Data

US 2008/0112380 A1 May 15, 2008

Related U.S. Application Data

(60) Provisional application No. 60/865,284, filed on Nov. 10, 2006.

(51) Int. Cl.
*H04H 20/71* (2008.01)
*H04W 4/00* (2009.01)
*H04W 72/00* (2009.01)
*H04B 7/212* (2006.01)

(52) U.S. Cl.
USPC ........... 370/312; 370/329; 370/338; 370/348; 455/450; 455/509

(58) Field of Classification Search
USPC ............... 370/312, 329, 338, 348; 455/450, 455/509
See application file for complete search history.

(56) References Cited

U.S. PATENT DOCUMENTS

| | | | | |
|---|---|---|---|---|
| 6,404,756 B1 * | 6/2002 | Whitehill et al. | ............. | 370/338 |
| 6,577,613 B1 * | 6/2003 | Ramanathan | ................. | 370/337 |
| 6,665,311 B2 * | 12/2003 | Kondylis et al. | ............. | 370/462 |
| 6,807,165 B2 * | 10/2004 | Belcea | ........................... | 370/347 |
| 7,280,555 B2 * | 10/2007 | Stanforth et al. | ............. | 370/445 |
| 7,321,762 B2 * | 1/2008 | Hoeben | ....................... | 455/412.2 |
| 7,376,100 B2 * | 5/2008 | Chang | ........................... | 370/329 |
| 7,443,823 B2 * | 10/2008 | Hunkeler et al. | ............. | 370/338 |
| 7,613,153 B2 * | 11/2009 | Chandra et al. | ............... | 370/338 |
| 7,616,655 B2 * | 11/2009 | Benveniste | ................... | 370/447 |
| 7,656,854 B2 * | 2/2010 | Benveniste | ................... | 370/348 |
| 7,656,899 B2 * | 2/2010 | Chandra | ....................... | 370/468 |
| 7,680,150 B2 * | 3/2010 | Liu et al. | ....................... | 370/469 |

(Continued)

FOREIGN PATENT DOCUMENTS

WO    WO 2005/122501    12/2005

OTHER PUBLICATIONS

International Preliminary Report on Patentability for International Patent Application Serial No. PCT/US2007/083948, mailed May 22, 2009.

(Continued)

*Primary Examiner* — Alpus H Hsu

(74) *Attorney, Agent, or Firm* — Garlick & Markison

(57) ABSTRACT

Aspects of a serial clear to send to self message procedure are presented. Aspects of a system may include a wireless local area network station (STA), which enables transmission of a channel reservation confirmation message, such as a CTS frame, via a reference RF channel, for example, a primary channel. The STA may enable transmission of one or more subsequent channel reservation confirmation messages, for example CTS frames, via a corresponding one or more subsequent RF channels, for example, a secondary channel. The STA may enable transmission of data frames via the reference RF channel and/or at least a portion of the corresponding one or more subsequent RF channels.

20 Claims, 7 Drawing Sheets

(56) References Cited

U.S. PATENT DOCUMENTS

| | | | |
|---|---|---|---|
| 7,734,809 B2* | 6/2010 | Joshi et al. | 709/235 |
| 7,783,300 B2* | 8/2010 | Sinha | 455/456.1 |
| 7,826,431 B2* | 11/2010 | Cave et al. | 370/338 |
| 7,940,688 B1* | 5/2011 | Benveniste | 370/252 |
| 2004/0196812 A1* | 10/2004 | Barber | 370/334 |
| 2005/0208956 A1 | 9/2005 | Takagi et al. | |
| 2006/0083197 A1* | 4/2006 | Kang | 370/329 |
| 2006/0159003 A1 | 7/2006 | Nanda et al. | |
| 2006/0171341 A1* | 8/2006 | Wang et al. | 370/311 |
| 2007/0076812 A1* | 4/2007 | Trachewsky | 375/267 |
| 2007/0097903 A1* | 5/2007 | Roy et al. | 370/328 |

OTHER PUBLICATIONS

IEEE P802.11n/D3.00, Part 11: Wireless LAN Medium Access Control (MAC) and Physical Layer (PHY) Specifications, pp. 1-9, 204-219, and 301-302, Sep. 2007.

* cited by examiner

SERIAL CLEAR TO SEND (CTS) TO SELF (CTS2SELF) MESSAGING PROCEDURE

CROSS-REFERENCE TO RELATED APPLICATIONS/INCORPORATION BY REFERENCE

This application makes reference to, claims priority to, and claims the benefit of U.S. Provisional Application Ser. No. 60/865,284, filed on Nov. 10, 2006, which is hereby incorporated herein by reference in its entirety.

FIELD OF THE INVENTION

Certain embodiments of the invention relate to communication networks. More specifically, certain embodiments of the invention relate to a serial clear to send (CTS) to self (CTS2SELF) messaging procedure.

BACKGROUND OF THE INVENTION

IEEE 802.11 describes a communication architecture, which may enable computing devices to communicate via wireless local area networks (WLANs). One of the building blocks for the WLAN is the basic service set (BSS). A BSS may comprise a plurality of computing devices, or stations (STA), which may communicate wirelessly via one or more RF channels within a coverage area. The span of a coverage area may be determined based on the distance over which a source STA may transmit data via an RF channel, which may be received by a destination STA.

An independent BSS (IBSS) refers to a BSS, which comprises a set of STAs, which may communicate with each over within the coverage area for the BSS. In an IBSS each STA may engage in direct communication with any of the other STAs within the IBSS provided that each STA is within the coverage area of the other. An IBSS may be referred to as an ad hoc network.

An infrastructure BSS refers to a BSS, which may be associated with an extended service set (ESS). The ESS is identified by a service set identifier (SSID). An infrastructure BSS may also be referred to as a BSS. Each of the BSSs within an ESS is identified by a BSS identifier (BSSID). Thus, STAs within a BSS generally determine their association within the BSS based on a BSSID and an SSID.

Each BSS comprises a plurality of STAs and an AP. The AP forms an association with each of the STAs within the BSS. The AP identifies each association by an association identifier (AID). The AP may provide communication services to STAs within a BSS based on the presence of an established association.

STAs within a BSS or IBSS may negotiate operating parameters, which the STAs may utilize to enable communications with other STAs within the BSS or IBSS. The operating parameters may include determination of an RF channel bandwidth that is to be utilized between communicating STAs. An RF channel utilized for communication between STAs may utilize a 20 MHz bandwidth or a 40 MHz bandwidth. The operating parameters may also include assignment(s) of RF channels to be utilized by communicating STAs within a given BSS or IBSS. Each RF channel may comprise a distinct range of frequencies as determined by applicable IEEE 802.11 specifications. A 20 MHz RF channel may comprise a single 20 MHz channel. A 40 MHz RF channel may comprise a 20 MHz primary channel and a 20 MHz secondary channel.

The operating parameters may also include specification of a modulation method that is to be utilized by STAs when transmitting data via the assigned RF channel. For example, a STA, for which communications are based on IEEE 802.11g specifications may utilize complementary code keying (CCK) modulation when transmitting data via an RF channel, while a STA, for which communications are based on IEEE 802.11n specifications may utilize orthogonal frequency division multiplexing (OFDM) when transmitting data via an RF channel.

STAs, which utilize IEEE 802.11 specifications may utilize a collision sense multiple access with collision avoidance (CSMA/CA) method to gain access to the wireless medium. Collisions may occur in a wireless communication medium when multiple STAs, within an RF transmission coverage area, concurrently utilize overlapping RF channel(s) in an attempt to transmit data. RF channels may overlap when at least one frequency is common between two or more of the concurrently overlapping RF channels. Collisions may result in unsuccessful transfer of data via the wireless communication medium, which may in turn result in reduced data transfer rates for data transmitted by the STAs. A STA that utilizes CSMA/CA may initiate an attempt to gain access to the wireless medium by transmitting a request to send (RTS) frame. The RTS frame may identify an originating STA, which transmitted the RTS frame, and identify a destination STA, which is the intended recipient of the RTS frame. The RTS frame may be transmitted via the RF channel, which was assigned for communications between the originating STA and the destination STA. When the originating STA and destination STA communicate via a 40 MHz RF channel, the RTS frame may be transmitted via the primary channel.

The RTS frames transmitted by the originating STA may be received by any STA that is within the RF coverage area for RF signals transmitted by the originating STA. The RTS frames sent via the primary channel may be received by STAs within the RF coverage area, which are configured to receive signals transmitted via one or more frequencies within the primary channel bandwidth. The STAs receiving the RTS frame(s) may respond by refraining from attempting to transmit signals via the primary channel for some determined period of time, for example as specified within the RTS frame, thus reducing the likelihood that collisions may occur while the originating STA is transmitting data via the primary channel.

A destination STA may respond to a received RTS frame by sending a clear to send (CTS) frame. The CTS frame may identify that originating STA, which was identified in the received RTS frame by the destination STA. The CTS frame may be transmitted via the RF channel, which was assigned for communications between the originating STA and the destination STA. When the originating STA and destination STA communicate via a 40 MHz RF channel, the CTS frame may be transmitted via the primary channel. Upon receipt of the CTS frame, the originating STA may determine that access to the wireless medium has been acquired.

Once a STA has gained access to the wireless medium, for example subsequent to an RTS/CTS frame exchange, the STA may begin to transmit data via the assigned RF channel while utilizing a specified modulation method. When the originating STA and destination STA communicate via a 40 MHz RF channel, the data may be transmitted via the primary channel and/or secondary channel.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A serial clear to send (CTS) to self (CTS2SELF) messaging procedure, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a serial clear to send (CTS) to self (CTS2SELF) messaging procedure. In an exemplary embodiment of the invention, an originating wireless station (STA), which utilizes a 40 MHz RF channel may attempt to gain access to a wireless communication medium by transmitting a clear to send (CTS) frame via the primary channel and by transmitting a CTS frame via a secondary channel. The CTS frames may be sent in a serial fashion. For example, the originating STA may send a CTS frame via the primary channel and, at a subsequent time instant, send a CTS frame via the secondary primary channel. Each CTS frame sent via the primary channel and the secondary channel may contain an address, which identifies the originating STA. In this aspect of the invention, each CTS frame represents a CTS2SELF message.

The CTS frames transmitted via the primary channel and the secondary channel by the originating STA may be received by any STA that is within the RF coverage area for RF signals transmitted by the originating STA. The CTS frames sent via the primary channel may be received by STAs within the RF coverage area, which are configured to receive signals transmitted via one or more frequencies within the primary channel bandwidth. The CTS frames sent via the secondary channel may be received by STAs within the RF coverage area, which are configured to receive signals transmitted via one or more frequencies within the secondary channel bandwidth. The STAs receiving the CTS frame(s) via the primary channel may respond by refraining from attempting to transmit signals via the primary channel for some determined period of time, thus reducing the likelihood that collisions may occur within the primary channel portion of the 40 MHz channel while the originating STA is transmitting data via the primary channel. The STAs receiving the CTS frame(s) via the secondary channel may respond by refraining from attempting to transmit signals via the secondary channel for some determined period of time, thus reducing the likelihood that collisions may occur within the secondary channel portion of the 40 MHz channel while the originating STA is transmitting data via the secondary channel.

Figure 1:
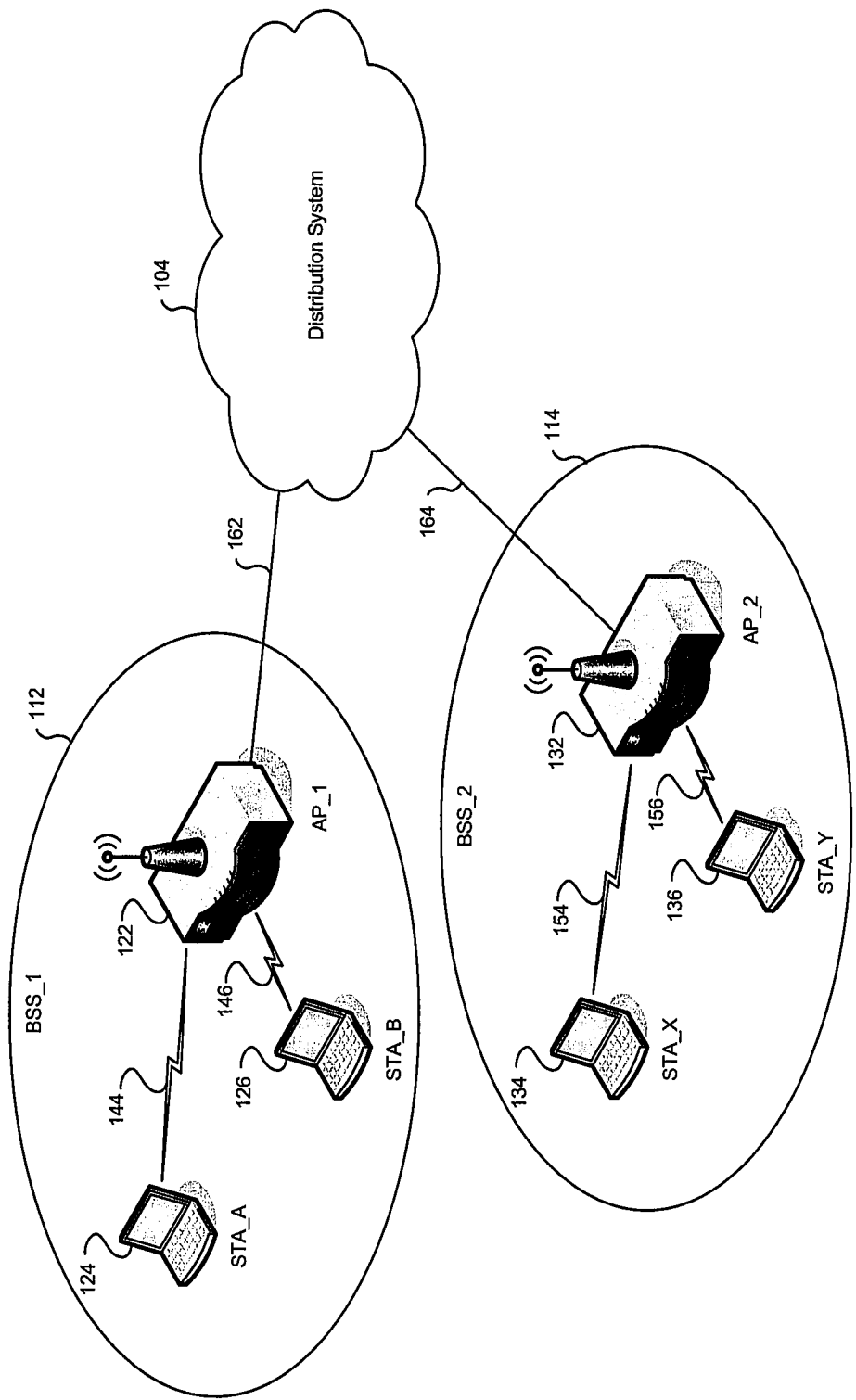
FIG. 1 is a block diagram of an exemplary system for wireless data communication, which may be utilized in connection with an embodiment of the invention.

FIG. 1 is a block diagram of an exemplary system for wireless data communication, which may be utilized in connection with an embodiment of the invention. Referring to FIG. 1, there is shown a BSS_1 112, a BSS_2 114 and a distribution system (DS) 104. The BSS_1 112 comprises an AP_1 122, a WLAN station STA_A 124 and an STA_B 126. The BSS_2 114 comprises an AP_2 132, an STA_X 134 and an STA_Y 136.

Within BSS_1 112, the AP_1 122 may communicate with STA_A 124 via a 20 MHz RF channel 144. The AP_1 122 may communicate with STA_B 126 via a 40 MHz RF channel 146. The AP_1 122 may negotiate with the STA_A 124 to establish an RF channel assignment and RF channel bandwidth based on, for example, the transmission of beacon frames. The RF channel assignment may comprise a center frequency, which may be utilized in connection with the 20 MHz RF channel bandwidth to determine the range of frequencies utilized by the RF channel 144. The AP_1 122 may negotiate with the STA_B 126 to establish an RF channel assignment and RF channel bandwidth based on, for example, the transmission of beacon frames. The 40 MHz RF channel 146 may comprise a primary channel and a secondary channel. The primary channel may comprise the range of frequencies utilized by the RF channel 144. The secondary channel may comprise a contiguous 20 MHz frequency bandwidth. The secondary channel may comprise a secondary channel center frequency, which may be utilized in connection with the 20 MHz secondary channel bandwidth to determine the range of frequencies utilized by the secondary channel.

Within BSS_2 114, the AP_2 132 may communicate with STA_X 134 via a 20 MHz RF channel 154. The AP_2 132 may communicate with STA_Y 136 via a 20 MHz RF channel 156. The AP_2 132 may negotiate with the STA_X 134 to establish an RF channel assignment and RF channel bandwidth based on, for example, the transmission of beacon frames. The RF channel assignment may comprise a center frequency, which may be utilized in connection with the 20 MHz RF channel bandwidth to determine the range of frequencies utilized by the RF channel 154. The AP_2 132 may negotiate with the STA_Y 136 to establish an RF channel assignment and RF channel bandwidth based on, for example, the transmission of beacon frames. The 20 MHz RF channel 156 may comprise the range of frequencies utilized by the RF channel 154.

The DS 104 may provide an infrastructure, which may be utilized to enable any of the STAs within the BSS_1 112 to communicate with any of the STAs within BSS_2 114, or vice versa. The DS 104 may utilize wireless communication (for example, via one or more RF channels), wired communication (for example, via copper or optical fiber cabling) or a combination thereof. STAs within the BSS_1 112 may transmit and/or receive data to and/or from the DS 104 via the AP_1 122. The AP_1 122 may transmit and/or receive data to and/or from the DS 104 via the interface 162. STAs within the BSS_2 114 may transmit and/or receive data to and/or from the DS 104 via the AP_2 132. The AP_2 132 may transmit and/or receive data to and/or from the DS 104 via the interface 164.

The STA_B 126 may attempt to access the wireless communication medium to reduce the likelihood that collisions may occur during transmission of data. The STA_B 126 may first attempt to receive signals via the wireless communication medium that comprise one or more frequencies that are within the 40 MHz bandwidth of the RF channel 146 to determine whether any other STAs, which are transmitting RF signals within a coverage area that includes the STA_B 126, are presently utilizing one or more of the frequencies within the RF channel 146 bandwidth to transmit signals.

In some conventional WLAN systems, which utilize CSMA/CA for example, the STA_B 126 may transmit an RTS frame via the primary channel portion of the RF channel 146. The RTS frame may identify the STA_A 124 as an originating STA and may identify the AP_1 122 as a destination STA. The AP_1 122, other STAs within the BSS_1 112, which are within the coverage area for RF signals transmitted by the STA_B 126, may receive the RTS frame transmitted by the STA_B 126 via the primary channel portion of the RF channel 146. The AP_1 122 may respond to the RTS frame by transmitting a CTS frame. The CTS frame may identify the STA_B 126 as the destination STA for the CTS frame.

In addition, STAs STA_X 134 and/or STA_Y 136 and APs AP_2 132 within the BSS 114, which are within the coverage area for RF signals transmitted by the STA_B 126, may receive the RTS frame transmitted by the STA_B 126 when those STAs and/or APs are configured to receive signals via one or more frequencies contained within the primary channel portion of the RF channel 146.

One potential shortcoming of some conventional methods for CSMA/CA is that STAs STA_X 134 and/or STA_Y 136 and/or APs AP_2 132 within the BSS_2 114 may not receive the RTS frame transmitted by the STA_B 126 via the primary channel portion of the RF channel 146, when the STAs and/or APs within the BSS_2 114 are configured to receive signals via one or more frequencies contained within the secondary channel portion of the RF channel 146.

The STA_B 126 may communicate with STA_A 124 by sending data frames to the AP_1 122 via the 40 MHz RF channel 146. The data frames may be transmitted via the primary channel portion and/or secondary channel portion of the RF channel 146 by utilizing OFDM. However, when the STAs STA_X 134 and/or STA_Y 136 and/or APs AP_2 132 within the BSS_2 114 are configured to receive signals via one or more frequencies within the secondary channel portion of the RF channel 146, the STAs STA_X 134 and/or STA_Y 136 and/or APs AP_2 132 may also be configured to utilize CCK modulation when receiving transmitted data signals and may not detect the signals and/or data frames utilizing OFDM that are transmitted by the STA_B 126 via the secondary channel portion of the RF channel 146. Alternatively, the STAs STA_X 134 and/or STA_Y 136 and/or APs AP_2 132 within the BSS_2 114 may attempt to detect the presence of signal energy within the wireless communication medium but may utilize a signal detection threshold level that does not enable detection of the signals transmitted by the STA_B 126. Consequently, any of the STAs STA_X 134 and/or STA_Y 136 and/or APs AP_2 132 within the BSS_2 114 may incorrectly determine that the frequencies within the RF channel bandwidth 154 and/or 156 are not currently being utilized for the transmission of signals and/or data frames.

Upon receipt of the CTS frame from the AP_1 122, the STA_B 126 may commence transmission of one or more data frames via the 40 MHz RF channel 146. The data frames sent by the STA_B 126 may identify the AP_1 122 as the recipient. The data frames may be transmitted by the STA_B 126 utilizing OFDM. The signals transmitted by the STA_B 126 may be distributed across a coverage area that comprises at least a portion of the BSS_1 112 and at least a portion of the BSS_2 114. The portion of the BSS_2 114 may comprise at least the location of one or more STAs STA_X 134 and/or STA_Y 136 and/or the AP_2 132. During the transmission of data frame(s) by the STA_B 126 to the AP_1 122, a STA_X 134 or AP_2 132 within the BSS_2 114, for example, which is within the coverage area for signals transmitted by the STA_B 126, may commence transmission of data frames. The STA_X 134 may transmit the data frames to the AP_2 132 via RF channel 154 utilizing CCK modulation. The RF channel 154 may comprise at least a portion of the frequencies that are within the secondary channel frequency band for RF channel 146. The signals transmitted vial the STA_X 134 may be distributed across a coverage area that comprises at least a portion of the BSS_2 114 and at least a portion of the BSS_1 112. The portion of the BSS_1 112 may comprise at least the location of STA_B 126 and/or the AP_1 122.

The concurrent transmission of signals via the 40 MHz RF channel 146 and the 20 MHz RF channel 154 within a common coverage area may result in collisions within the wireless communication medium. As a result of such collisions, the AP_1 122 may receive signals from the STA_B 126 via frequencies within the primary channel portion of the RF channel 146, and may receive signals from both the STA_B 126 and from the STA_X 134 via frequencies within the secondary channel portion of the RF channel 146.

The reception of signals at the AP_1 122 from both the STA_B 126 and from the STA_X 134 via frequencies within the secondary channel portion of the RF channel 146 may result in a corruption of the data received via the secondary channel at the AP_1 122. The intended data to be received at the AP_1 122 may comprise data contained within data frames transmitted by the STA_B 126. As a result of the collisions, the AP_1 122 may detect errors within received data and/or may not detect a properly formed data frame at all. This may result in a loss of data, which may in turn result in retransmission of data by the STA_B 126. This may result in a reduction in data throughput performance for data communications between the STA_B 126 and the AP_1 122. A corresponding reduction in data throughput performance for data communications may occur for communications between the STA_X 134 and the AP_2 132.

In various embodiments of the invention, the STA_B 126 may attempt to access the wireless communication medium to enable transmission of data frames via the 40 MHz RF channel 146 by utilizing a serial CTS2SELF messaging procedure. The STA_B 126 may transmit a CTS frame via the primary channel portion of the RF channel 146. The CTS frame may contain an address, which identifies the STA_B 126. The CTS frame sent via the primary channel portion of the RF channel 146 may notify STAs and/or APs within the STA_B 126 coverage area (including the AP_1 122) that the STA_B 126 may be preparing to utilize at least a portion of the frequencies within the primary channel bandwidth to transmit signals via the wireless communication medium. The STAs and/or APs may respond to the received CTS frame by refraining from transmitting signals via frequencies contained within at least the primary channel portion of the RF channel 146. A STA and/or AP, which receives data frames, which contain an address which identifies it as the singular intended recipient, from the STA_B 126, transmitted via at least the primary channel portion of the RF channel 146, may respond by transmitting signals and/or data via frequencies contained within at least the primary channel portion of the RF channel 146.

The STA_B 126 may subsequently transmit a CTS frame via the secondary channel portion of the RF channel 146. The CTS frame may contain an address, which identifies the STA_B 126. The transmitted CTS frame may notify STAs and/or APs within the STA_B 126 coverage area that the STA_B 126 may be preparing to utilize at least a portion of the frequencies within the secondary channel bandwidth to transmit signals via the wireless communication medium. The STAs and/or APs may respond to the received CTS frame by refraining from transmitting signals via frequencies contained within the secondary channel portion of the RF channel 146. A STA and/or AP, which receives data frames, which contain an address which identifies it as the singular intended recipient, from the STA_B 126, transmitted via at least the secondary channel portion of the RF channel 146, may respond by transmitting signals and/or data via frequencies contained within at least the secondary channel portion of the RF channel 146.

As a result of the CTS2SELF procedure, the other STAs and AP within the BSS_1 112, which are within the coverage area of signals transmitted via the STA_B 126, may refrain from transmitting signals via frequencies contained within either the primary channel or secondary channel portions of the RF channel 146. Similarly, the STAs and AP within the BSS_2 114, which are within the coverage area of signals transmitted via the STA_B 126, may also refrain from transmitting signals via frequencies contained within either the primary channel or secondary channel portions of the RF channel 146. The result may produce a reduced likelihood that collisions will occur during transmission of data frames by the STA_B 126.

Figure 2:
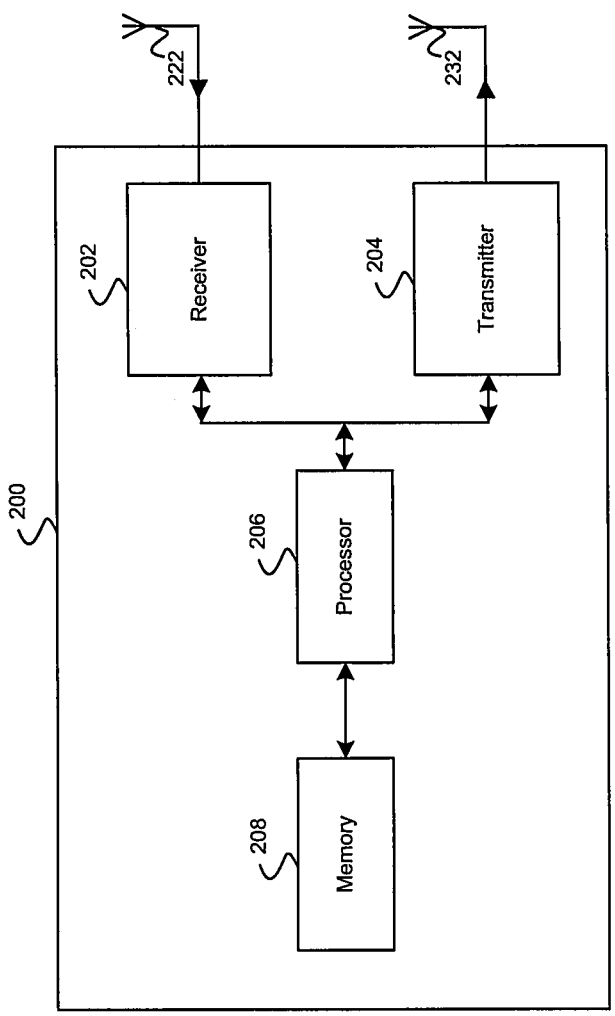
FIG. 2 is an exemplary transceiver system, which may be utilized in connection with an embodiment of the invention.

FIG. 2 is an exemplary transceiver system, which may be utilized in connection with an embodiment of the invention. A WLAN STA and/or AP may comprise a transceiver system, which in various embodiments of the invention may not be limited to the exemplary transceiver system presented in FIG. 2. Referring to FIG. 2, there is shown a transceiver system 200, a receiving antenna 222 and transmitting antenna 232. The transceiver system 200 may comprise at least a receiver 202, a transmitter 204, a processor 206, and a memory 208. Although a transceiver system is shown in FIG. 2, transmit and receive functions may be separately implemented.

In accordance with an embodiment of the invention, the processor 206 may comprise suitable logic, circuitry and/or code to enable digital receiver and/or transmitter functions in accordance with applicable communications standards. The processor 206 may also perform various processing tasks on received data. The processing tasks may comprise computing channel estimates, which may characterize the wireless communication medium, delineating frame boundaries in received data, and computing frame error rate statistics indicative of the presence or absence of detected bit errors in received frame. The processor 206 may also enable the determination of methods for processing received signals. The signal processing methods may comprise selection of one or more RF channels for the reception of signals, and/or the determination of modulation method(s) for detecting data frames received via the selected RF channel(s).

The receiver 202 may comprise suitable logic, circuitry and/or code that may enable performance of receiver functions that may comprise, but are not limited to, the amplification of received RF signals, generation of frequency carrier signals corresponding to selected RF channels, the down-conversion of the amplified RF signals by the generated frequency carrier signals, demodulation of data contained in data symbols based on application of a selected demodulation type, and detection of data contained in the demodulated signals. The RF signals may be received via the receiving antenna 222. The data received via the RF signals may be communicated to the processor 206.

The transmitter 204 may comprise suitable logic, circuitry and/or code that may enable performance of transmitter functions that may comprise, but are not limited to, modulation of received data to generate data symbols based on application of a selected modulation type, generation of frequency carrier signals corresponding to selected RF channels, the up-conversion of the data symbols by the generated frequency carrier signals, and the generation and amplification of RF signals. The data may be received from the processor 206 and/or memory 208. The RF signals may be transmitted via the transmitting antenna 232.

The memory 208 may comprise suitable logic, circuitry and/or code that may enable storage and/or retrieval of data and/or code. The memory 208 may utilize any of a plurality of storage medium technologies, such as volatile memory, for example random access memory (RAM), and/or non-volatile memory, for example electrically erasable programmable read only memory (EEPROM). In the context of the present application, the memory 208 may enable storage of code for a serial CTS2SELF messaging procedure.

In operation, the processor 206 may enable an STA_B 126 to attempt to access a 40 MHz RF channel 146. The processor 206 may enable generation of a CTS frame, which is transmitted via the primary channel portion of the RF channel 146. The CTS frame may contain an address, which identifies the STA_B 126. The processor 206 may send the CTS frame to the transmitter 204. The processor 206 may configure the transmitter 204 to enable transmission of the CTS frame via the primary channel portion of the RF channel 146. The processor 206 may configure the transmitter 204 to utilize a modulation method, for example CCK modulation, when transmitting the CTS frame via the primary channel portion of the RF channel 146.

The processor 206 may enable the subsequent generation of a CTS frame, which may be transmitted via the secondary portion of the RF channel 146. The CTS frame may contain an address, which identifies the STA_B 126. The processor 206 may send the CTS frame to the transmitter 204. The processor 206 may configure the transmitter 204 to enable transmission of the CTS frame via the secondary channel portion of the RF channel 146. The processor 206 may configure the transmitter 204 to utilize a modulation method, for example CCK modulation, when transmitting the CTS frame via the secondary channel portion of the RF channel 146.

The processor 206 may enable the subsequent determination that access of the wireless communication medium has been gained, which enables a reduced likelihood of data collisions during transmission of data frames via the RF channel 146. The processor 206 may enable generation of subsequent data frames, which may be sent to the transmitter 204 and transmitted via the primary channel portion and/or secondary channel portion of the RF channel 146. The processor 206 may configure the transmitter 204 to utilize a modulation method, for example OFDM, when transmitting the subsequent data frames via the primary and/or secondary channel portions of the RF channel 146.

Figure 3:
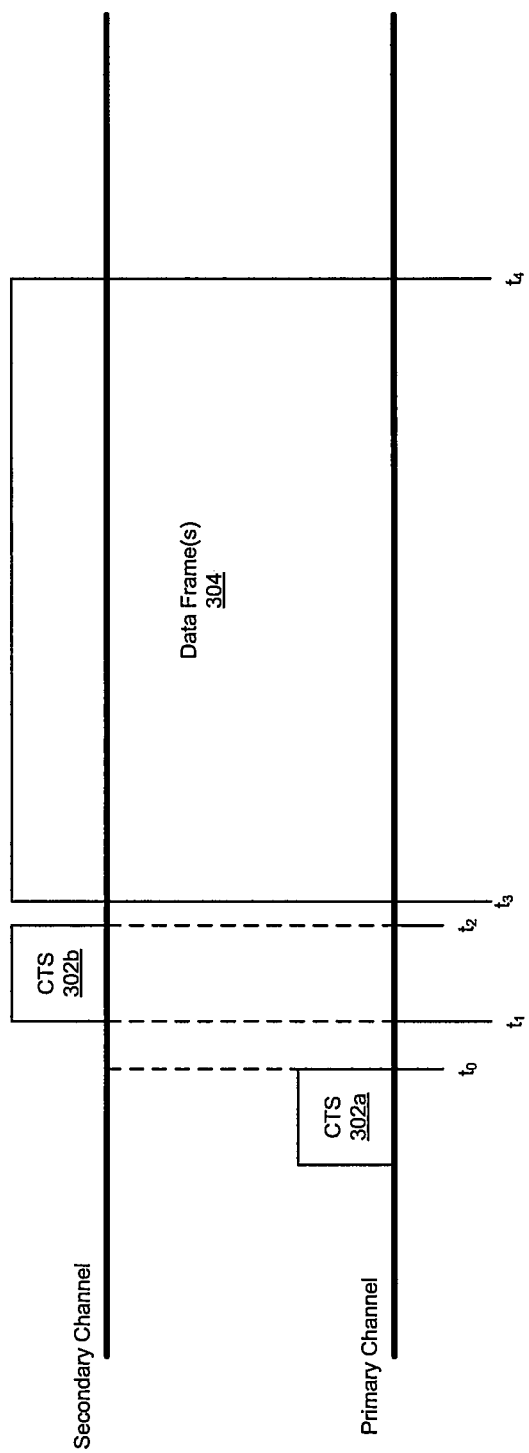
FIG. 3 is a diagram illustrating an exemplary serial clear to send to self messaging procedure, in accordance with an embodiment of the invention.

FIG. 3 is a diagram illustrating an exemplary serial clear to send to self messaging procedure, in accordance with an embodiment of the invention. FIG. 3 presents an exemplary serial CTS2SELF messaging procedure in which both the primary channel portion of an RF channel 146 and the secondary channel portion of the RF channel 146 may be available for transmission of data frames by an STA_B 126. In an exemplary embodiment of the invention, the RF channel 146 comprises a 40 MHz bandwidth and each of the primary channel and secondary channel comprise a 20 MHz bandwidth.

Referring to FIG. 3, an STA_B 126 may attempt to access the wireless communication medium by transmitting a CTS frame 302a via the primary channel. Prior to transmitting the CTS frame, the STA_B 126 may perform a clear channel assessment (CCA) to determine whether any other STAs and/or APs are presently transmitting signals and/or data via one or more frequencies contained within the primary channel bandwidth. The STA_B 126 may perform the CCA by being configured to receive signals and/or data via any of the frequencies contained within the primary channel bandwidth. The STA_B 126 may alternatively attempt to detect signal energy and/or data during the CCA time interval.

Following the transmission of the CTS frame 302a, at a time instant $t_0$, the STA_B 126 may initiate a CCA to determine whether any other STAs and/or APs are presently transmitting signals and/or data via one or more frequencies contained within the secondary channel bandwidth. If the STA_B 126 does not detect signals and/or data at subsequent time instants, the STA_B 126 may end the CCA at a subsequent time instant, $t_1$. In various embodiments of the invention, the time duration beginning at time instant $t_0$ and ending at time instant $t_1$ may be specified by a time interval that is specified for a point coordination function interframe spacing (PIFS) time interval. An exemplary PIFS time interval may be specified within applicable IEEE 802.11 specifications document(s).

The STA_B 126 may transmit a CTS frame 302b via the secondary channel at or after the time instant, $t_1$. A time interval following transmission of the CTS frame 302b may begin at a time instant $t_2$. At this time, the STA_B 126 may begin to prepare to transmit data frame(s) via the primary channel and/or secondary channel portions of the RF channel 146. The STA_B 126 may commence transmission of data frame(s) at a subsequent time instant $t_3$. In various embodiments of the invention, the time duration beginning at time instant $t_2$ and ending at time instant $t_3$ may be specified by a time interval that is specified for an interframe spacing (IFS) time interval. In an exemplary embodiment of the invention, the IFS may comprise a short IFS (SIFS) time interval. An exemplary SIFS may be specified within applicable IEEE 802.11 specification document(s). Subsequent to the time instant $t_3$ the STA_B 126 may commence transmission of data frame(s) 304 via the primary and/or the secondary channel portions of the RF channel 146.

The CTS frames 302a and/or 302b may specify a time duration, which corresponds to the length of time, which the STA_B 146 requests to reserve for utilization of the wireless medium to enable transmission of data frame(s) 304 via the primary channel and/or secondary channel. In the exemplary FIG. 3, the requested time duration for the primary channel may end at the time instant $t_4$. Similarly, the requested time duration for the secondary channel may end at the time instant $t_4$. The STAs and/or APs receiving the CTS frame 302a via the primary channel may comply with the CTS frame time duration request by refraining from attempting to transmit signal and/or data via any of the frequencies contained within the primary channel bandwidth until a time instant subsequent to the time instant 4. Similarly, STAs and/or APs receiving the CTS frame 302b via the secondary channel may comply with the CTS frame time duration request by refraining from attempting to transmit signal and/or data via any of the frequencies contained within the secondary channel bandwidth until a time instant subsequent to the time instant $t_4$.

Figure 4:
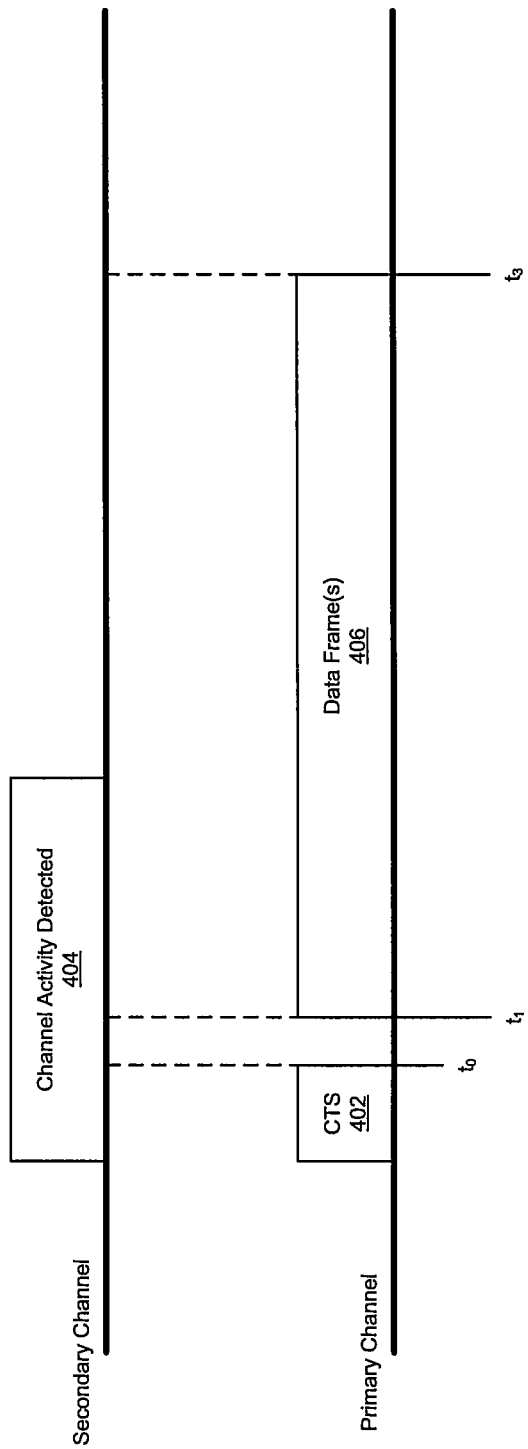
FIG. 4 is a diagram illustrating an exemplary serial clear to send to self messaging procedure for transmission of data frames via the primary channel, in accordance with an embodiment of the invention.

FIG. 4 is a diagram illustrating an exemplary serial clear to send to self messaging procedure for transmission of data frames via the primary channel, in accordance with an embodiment of the invention. FIG. 4 presents an exemplary CTS2SELF messaging procedure in which the primary channel portion of an RF channel 146 may be available for transmission of data frames by an STA_B 126 but the secondary channel portion of the RF channel 146 may not be available for transmission of data frames. When signals and/or data are detected via the secondary channel portion of the RF channel 146 in the interval immediately subsequent to the transmission of the CTS on the primary channel, the STA_B 126 may refrain from transmitting a CTS on the secondary channel, and instead, commence transmission of data frame(s) via the primary channel portion of the RF channel 146. In an exemplary embodiment of the invention, the RF channel 146 comprises a 40 MHz bandwidth and each of the primary channel and secondary channel comprise a 20 MHz bandwidth.

Referring to FIG. 4, an STA_B 126 may attempt to access the wireless communication medium by transmitting an CTS frame 402 via the primary channel. Following the transmission of the CTS frame 402, at a time instant $t_0$, the STA_B 126 may initiate a CCA to determine whether any other STAs and/or APs are presently transmitting signals and/or data via one or more frequencies contained within the secondary channel bandwidth. In the exemplary FIG. 4, the STA_B 126 may detect channel activity 404 via the secondary channel. The detected channel activity 404 may comprise signals and/or data frames, which may be received by the STA_B 126 via one or more frequencies within the secondary channel bandwidth. The STA_B 126 may end the CCA at a subsequent time instant, $t_1$. In various embodiments of the invention, the time duration beginning at time instant $t_0$ and ending at time instant $t_1$ may be specified by a time interval that is specified for a PIFS time interval. The STA_B 126 may commence transmission of data frame(s) 406 via the primary channel portion of the RF channel 146 at a time instant subsequent to the time instant $t_1$.

The CTS frame 402 may specify a time duration, which corresponds to the length of time, which the STA_B 146 may request to be reserved for utilization of the wireless medium to enable transmission of data frame(s) via the primary channel. In the exemplary FIG. 4, the requested time duration for the primary channel may end at the time instant $t_3$.

Figure 5:
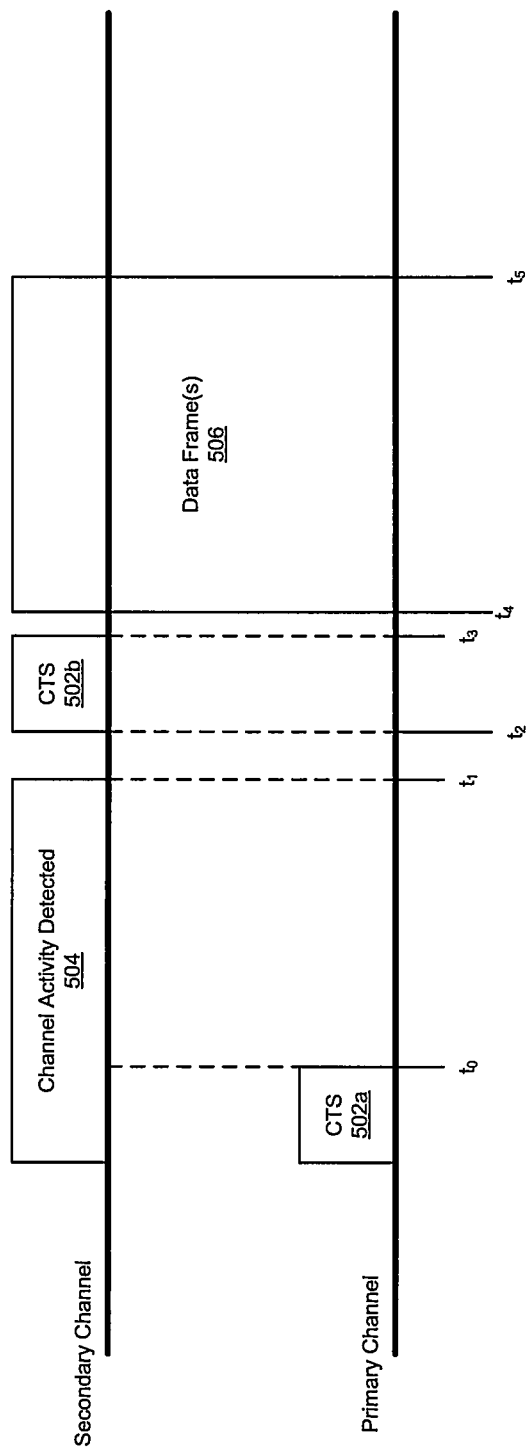
FIG. 5 is a diagram illustrating an exemplary serial clear to send to self messaging procedure with delayed transmission of data frames via the primary channel and secondary channel, in accordance with an embodiment of the invention.

FIG. 5 is a diagram illustrating an exemplary serial clear to send to self messaging procedure with delayed transmission of data frames via the primary channel and secondary channel, in accordance with an embodiment of the invention. FIG. 5 presents an exemplary CTS2SELF messaging procedure in which the primary channel portion of an RF channel 146 may be available for transmission of data frames by an STA_B 126 but the secondary channel portion of the RF channel 146 may not be available for transmission of data frames. When signals and/or data are detected via the secondary channel portion of the RF channel 146, the STA_B 126 may wait until the secondary channel becomes available and subsequently commences transmission of a second CTS to self frame via the secondary channel and then data frame(s) via the primary channel and secondary channel portions of the RF channel 146. In an exemplary embodiment of the invention, the RF channel 146 comprises a 40 MHz bandwidth and each of the primary channel and secondary channel comprise a 20 MHz bandwidth.

Referring to FIG. 5, an STA_B 126 may attempt to access the wireless communication medium by transmitting a CTS frame 502a via the primary channel. Following the transmission of the CTS frame 502a, at a time instant $t_0$, the STA_B 126 may initiate a CCA to determine whether any other STAs and/or APs are presently transmitting signals and/or data via one or more frequencies contained within the secondary channel bandwidth. In the exemplary FIG. 5, the STA_B 126 may detect channel activity 504 via the secondary channel. The STA_B 126 may delay attempts to transmit data frames via the primary channel portion of the RF channel 146 and may instead wait until the secondary channel portion of the RF channel 146 becomes available. The detected channel activity 504 may end at a subsequent time instant $t_1$. The STA_B 126 may continue CCA for the secondary portion of the RF channel 146 until the subsequent time instant $t_2$. In various embodiments of the invention, the time duration beginning at time instant $t_1$ and ending at time instant $t_2$ may be specified by a time interval that is specified for a PIFS time interval.

The STA_B 126 may transmit a CTS frame 502b via the secondary channel at or after the time instant, $t_2$. A time interval following transmission of the CTS frame 502b may begin at a time instant $t_3$. At this time, the STA_B 126 may begin to prepare to transmit data frame(s) via the primary channel and/or secondary channel portions of the RF channel 146. The STA_B 126 may commence transmission of data frame(s) at a subsequent time instant $t_4$. In various embodiments of the invention, the time duration beginning at time instant $t_3$ and ending at time instant $t_4$ may be specified by a time interval that is specified for an IFS time interval. In an exemplary embodiment of the invention, the IFS may comprise a SIFS time interval. Subsequent to the time instant $t_4$ the STA_B 126 may commence transmission of data frame(s) 506 via the primary and/or secondary channel portions of the RF channel 146.

The CTS frame 502a may specify a time duration, which corresponds to the length of time, which the STA_B 146 requests to reserve for utilization of the wireless medium to enable transmission of data frame(s) via the primary channel. In the exemplary FIG. 5, the requested time duration for the primary channel may end at the time instant $t_5$. The CTS frame 502b may specify a time duration, which corresponds to the length of time, which the STA_B 146 requests to reserve for utilization of the wireless medium to enable transmission of data frame(s) via the secondary channel. In the exemplary FIG. 5, the requested time duration for the secondary channel may end at the time instant $t_5$. In various embodiments of the invention, the requested time duration for the secondary channel may be specified such that the requested time duration for the secondary channel ends at about the time instant as the requested time duration for the primary channel.

Figure 6:
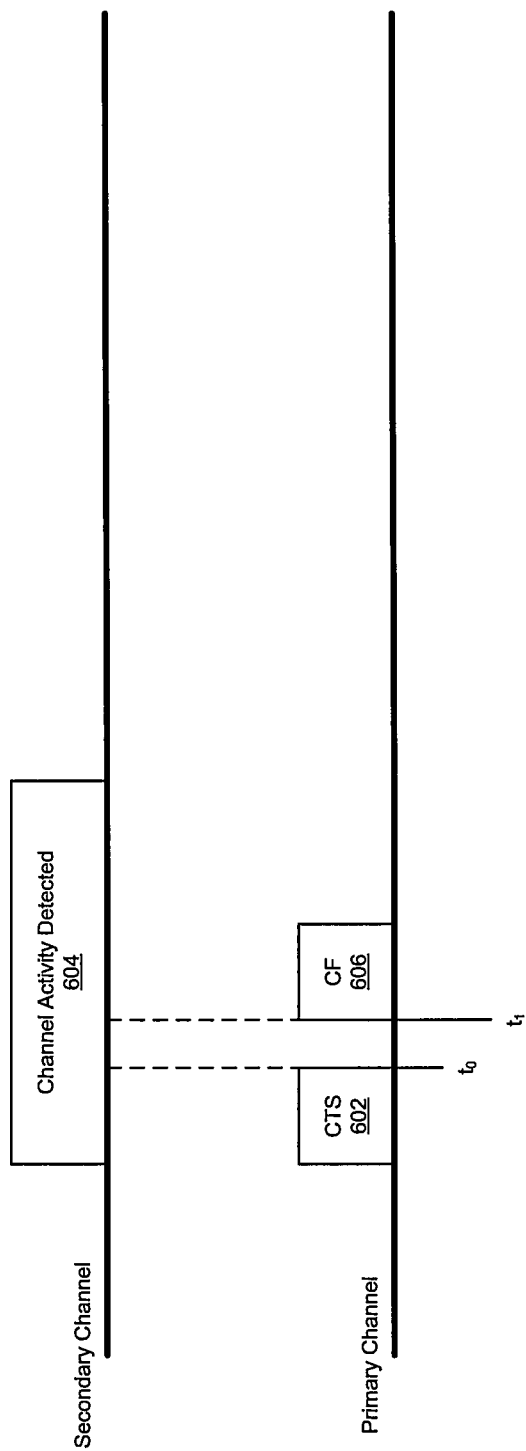
FIG. 6 is a diagram illustrating an exemplary serial clear to send to self messaging procedure with cancellation of access for the primary channel, in accordance with an embodiment of the invention.

FIG. 6 is a diagram illustrating an exemplary serial clear to send to self messaging procedure with cancellation of access for the primary channel, in accordance with an embodiment of the invention. FIG. 6 presents an exemplary CTS2SELF messaging procedure in which the primary channel portion of an RF channel 146 may be available for transmission of data frames by an STA_B 126 but the secondary channel portion of the RF channel 146 may not be available for transmission of data frames. When signals and/or data are detected via the secondary channel portion of the RF channel 146, the STA_B 126 may cancel access to the wireless medium for utilization of the primary channel portion of the RF channel 146. The STA_B 126 may attempt to access the wireless medium at a subsequent time instant. In an exemplary embodiment of the invention, the RF channel 146 comprises a 40 MHz bandwidth and each of the primary channel and secondary channel comprise a 20 MHz bandwidth.

Referring to FIG. 6, an STA_B 126 may attempt to access the wireless communication medium by transmitting a CTS frame 602 via the primary channel. Following the transmission of the CTS frame 602, at a time instant $t_0$, the STA_B 126 may initiate a CCA to determine whether any other STAs and/or APs are presently transmitting signals and/or data via one or more frequencies contained within the secondary channel bandwidth. In the exemplary FIG. 6, the STA_B 126 may detect channel activity 604 via the secondary channel. The STA_B 126 may delay attempts to transmit data frames via the primary channel portion of the RF channel 146 and may instead wait until the secondary channel portion of the RF channel 146 becomes available. Furthermore, the STA_B 126 may release access to the wireless communication medium for transmission of signals via the primary channel portion of the RF channel 146, which may have been acquired in response to transmission of the CTS frame 602. The STA_B 126 may end the CCA at a subsequent time instant $t_1$. In various embodiments of the invention, the time duration beginning at time instant $t_0$ and ending at time instant $t_1$ may be specified by a time interval for a PIFS time interval.

Subsequent to the ending of the CCA for the secondary channel, the STA_B 126 may release the primary channel by transmitting a contention free end (CF-End) frame 606 via the primary channel. Receipt of the CF-End frame 606 may notify a receiving STA 124 that a STA 126, which previously may have gained access to the wireless communication medium for transmitting signals via the primary channel, is releasing the previously gained access. Upon receipt of the CF-End frame 606, a receiving STA may attempt to access the wireless medium to transmit signals via one or more frequencies contained within the primary channel portion of the RF channel 146. The STA_B 126 may subsequently attempt to gain access to the wireless communication medium to transmit signals via the primary channel and/or secondary channel portions of the RF channel 146.

Figure 7:
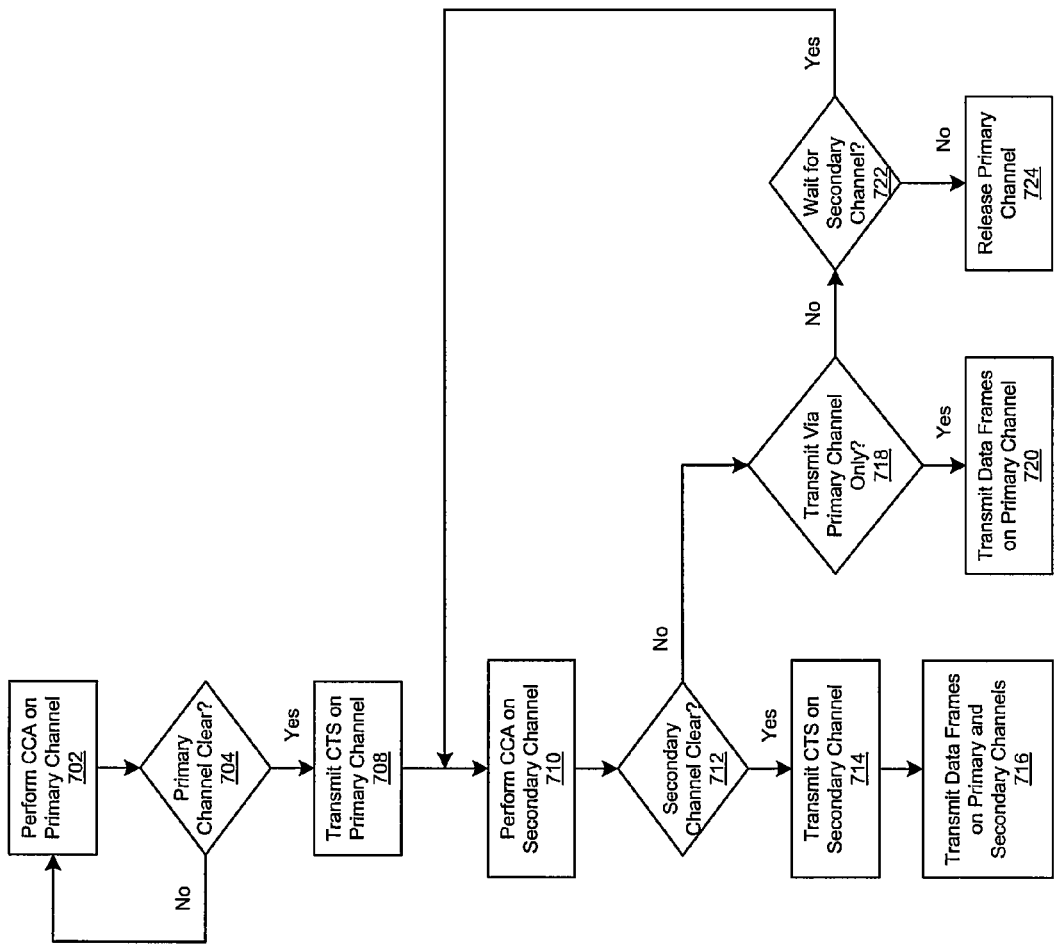
FIG. 7 is a flowchart illustrating exemplary steps for a serial clear to self message procedure, in accordance with an embodiment of the invention.

FIG. 7 is a flowchart illustrating exemplary steps for a serial clear to self message procedure, in accordance with an embodiment of the invention. Referring to FIG. 7, in step 702, a STA_B 126 may perform a CCA on a primary channel portion of an RF channel 146. In step 704, the STA_B 126 may determine whether the wireless communication medium is available, or clear, to be utilized for transmitting data frames via the frequencies contained within the primary channel bandwidth. In instances when it may be determined that the primary channel may not be clear, in step 704, the STA_B 126 may continue the CCA for the primary channel in step 702.

In instances when it is determined that the primary channel may be clear, in step 704, in step 708, the STA_B 126 may transmit a CTS frame via the primary channel. In step 710, the STA_B 126 may perform a CCA on the secondary channel portion of the RF channel 146. In step 712, the STA_B 126 may determine whether the secondary channel is clear. In instances when it is determined that the secondary channel may be clear in step 712, in step 714, the STA_B 126 may transmit a CTS frame via the secondary channel. In step 716, the STA_B 126 may commence transmission of data frames via the primary and/or secondary channels.

When the secondary channel is not determined to be clear in step 712, in step 718, the STA_B 126 may determine whether to transmit data frames via the primary channel only.

In instances when the STA_B 126 determines, in step 718, that data frames may be transmitted via the primary channel only, in step 720, the STA_B 126 may transmit data frames via the primary channel.

In instances when the STA_B 126 determines, in step 718, that data frame may not be transmitted via the primary channel only, in step 722, the STA_B 126 may determine whether to wait for the secondary channel to become clear before transmitting data frames. In instances when the STA_B 126 determined, in step 722, to not wait for the secondary channel to become available, in step 724, the STA_B 126 may transmit a CF-End frame to release the primary channel. The STA_B 126 may subsequently repeat the process beginning at step 702 at a subsequent time instant.

In instances when the STA_B 126 determined, in step 722, to wait for the secondary channel to become available, the STA_B 126 may continue the CCA on the secondary channel at step 710.

Aspects of a serial clear to send to self message procedure are presented. Aspects of a system may include a wireless local area network station (STA) 126, which enables transmission of a channel reservation confirmation message, such as a CTS frame, via a reference RF channel, for example, a primary channel. The STA 126 may enable transmission of one or more subsequent channel reservation confirmation messages, for example CTS frames, via a corresponding one or more subsequent RF channels, for example, a secondary channel. The STA 126 may enable transmission of data frames via the reference RF channel and/or at least a portion of the corresponding one or more subsequent RF channels. In various embodiments of the invention the one or more subsequent RF channels may comprise a secondary channel. Various embodiments of the invention may enable the STA 126 to transmit data frames via a primary channel, secondary channel, tertiary channel, &c.

The STA 126 may enable assessment of the reference RF channel, for example a CCA, prior to transmitting the channel reservation confirmation message via the reference RF channel. The assessment may comprise attempting to detect signals and/or receive data via the reference RF channel. The channel reservation confirmation message may be transmitted based on the assessment. The STA 126 may enable the sequential assessment of each of the corresponding one or more subsequent RF channels subsequent to transmitting the channel reservation confirmation message via the reference RF channel. The STA 126 may assess a current one of the corresponding one or more subsequent RF channels before assessing the next one. The portion of the one or more subsequent RF channels that are utilized for the transmission of data frames may be selected based on the sequential assessing.

The STA 126 may enable transmission of a corresponding one of the subsequent channel reservation confirmation messages subsequent to the sequential assessment of each of the one or more subsequent RF channels. The STA 126 may enable an assessment of a next one of the corresponding one or more subsequent RF channels subsequent to transmitting the current one or the corresponding one or more subsequent channel reservation messages. After sending a CTS message for a current RF channel, the STA 126 may assess the next RF channel. The STA 126 may transmit a CTS message as it assesses each of the subsequent RF channels when the channels are assessed to be in a channel clear state.

The STA 126 may enable gaining of access to a wireless communication medium based on transmission of a channel reservation confirmation message via the reference RF channel and on transmission of each one of the one or more subsequent channel reservation confirmation messages. The STA 126 may enable concurrent transmission of the data frames via the reference RF channel and at least a portion of the one or more subsequent RF channels subsequent to gaining access to the wireless communication medium based on the transmitted channel reservation confirmation message and on transmission of each of the one or more subsequent channel reservation confirmation messages. The STA 126 may concurrently transmit data frames via the reference RF channel and via each of the subsequent RF channels.

In various embodiments of the invention, a channel reservation may be cancelled based on subsequent RF channel assessments. The STA 126 may enable transmission of a channel reservation confirmation message via a reference RF channel. The STA 126 may enable assessment of one or more subsequent RF channels subsequent to transmission of the channel reservation confirmation message via the reference RF channel. The STA 126 may enable transmission of a channel reservation cancellation message, such as a CF-End frame, via the reference RF channel based on the assessment. The STA 126 may enable transmission of one or more subsequent channel reservation confirmation messages and one or more corresponding channel reservation cancellation messages.

Another embodiment of the invention may provide a machine-readable storage, having stored thereon, a computer program having at least one code section executable by a machine, thereby causing the machine to perform the steps as described herein for a serial clear to send to self messaging procedure.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for communicating data, the method comprising:
   transmitting, by an originating wireless station, to a plurality of wireless stations, a first clear to send (CTS) to self message via a first channel and identifying the originating wireless station as a destination of the CTS to self message, the originating wireless station determining a first time interval to reserve the first channel, and the originating wireless station also communicating with an access point as a station to the access point;
   assessing a second channel to determine channel activity on the second channel and when channel activity is detected, to continue to assess the second channel until channel activity is no longer detected or until a predetermined time interval for assessing the second channel has lapsed;
   transmitting, by the originating wireless station, to the plurality of wireless stations, a second CTS to self message subsequent to the first CTS to self message via the second channel, when channel activity on the second channel is not detected within the predetermined time interval, the originating wireless station determining a second time interval to reserve the second channel, in which the second time interval to end substantially at a same time the first time interval of the first channel is to end; and
   transmitting, by said originating wireless station, to an intended recipient wireless station of the plurality of wireless stations, data frames via the first and second channels in a period following the first and second CTS to self messages, in which other wireless stations of the plurality of wireless stations refrain from transmitting in response to transmission of the first and second CTS to self messages.

2. The method according to claim 1, further comprising assessing the first channel prior to transmitting the first CTS to self message via the first channel.

3. The method according to claim 2, wherein transmitting the first CTS to self message is based on assessing the first channel.

4. The method according to claim 2, further comprising assessing the second channel subsequent to transmitting the first CTS to self message.

5. The method according to claim 2, wherein transmitting the first and second CTS to self messages is from the originating wireless station that communicates with the access point in a wireless network that also includes the plurality of wireless stations.

6. The method according to claim 5, wherein transmitting the first and second CTS to self messages allows the originating wireless station to gain access to the wireless network without requesting access from the access point.

7. The method according to claim 6, wherein the data frames are concurrently transmitted via the first and second channels.

8. The method according to claim 1, wherein transmitting the first and second CTS to self messages allows the originating wireless device to gain access to a wireless network without requesting access from the access point in the wireless network.

9. A system for communicating data, the system comprising:
   one or more circuits of an originating wireless station that enable transmission to a plurality of wireless stations, a clear to send (CTS) to self message via a first channel and identifying the originating wireless station as a destination of the CTS to self message, said one or more circuits to determine a first time interval to reserve the first channel, and the originating wireless station also communicating with an access point as a station to the access point;
   said one or more circuits to assess a second channel to determine channel activity on the second channel and when channel activity is detected, to continue to assess the second channel until channel activity is no longer detected or until a predetermined time interval for assessing the second channel has lapsed;
   said one or more circuits to enable transmission of a second CTS to self message subsequent to the first CTS to self message via a second channel, when channel activity on the second channel is not detected within the predetermined time interval, said one or more circuits to determine a second time interval to reserve the second channel, in which the second time interval to end substantially at a same time the first time interval of the first channel is to end; and
   said one or more circuits to enable concurrent transmission to an intended recipient wireless station of the plurality of wireless stations, data frames via the first and second channels in a period following the first and second CTS to self messages, in which other wireless stations of the plurality of wireless stations refrain from transmitting in response to transmission of the first and second CTS to self messages.

10. The system according to claim 9, wherein the one or more circuits to enable assessment of the first channel prior to transmitting the first CTS to self message via the first channel.

11. The system according to claim 10, wherein the one or more circuits to enable transmission of the first CTS to self message based on the assessment of the first channel.

12. The system according to claim 9, wherein the one or more circuits to enable assessment of the second channel subsequent to transmitting the first CTS to self message.

13. The system according to claim 9, wherein the one or more circuits to enable transmission of the first and second CTS to self messages is from the originating wireless station that communicates with the access point in a wireless network that also includes the plurality of wireless stations.

14. The system according to claim 13, wherein the one or more circuits to enable gaining an access to a wireless network based on the CTS to self message without requesting access from the access point.

15. The system according to claim 14, wherein the one or more circuits to enable concurrent transmission of the data frames via the first and second channels.

16. The system according to claim 9, wherein the one or more circuits to enable gaining an access to a wireless network based on the CTS to self message without requesting access from the access point of the wireless network.

17. An apparatus comprising:
    one or more circuits that function to place the apparatus as an originating wireless station to enable transmission to a plurality of wireless stations, a clear to send (CTS) to self message via a first channel and identifying the originating wireless station as a destination of the CTS to self message, said one or more circuits to determine a first time interval to reserve the first channel, and the apparatus, as the originating wireless station, also communicating with an access point as a station to the access point;
    said one or more circuits to assess a second channel to determine channel activity on the second channel and when channel activity is detected, to continue to assess the second channel until channel activity is no longer detected or until a predetermined time interval for assessing the second channel has lapsed;

said one or more circuits to enable transmission of a second CTS to self message subsequent to the first CTS to self message via a second channel, when channel activity on the second channel is not detected within the predetermined time interval, said one or more circuits to determine a second time interval to reserve the second channel, in which the second time interval to end substantially at a same time the first time interval of the first channel is to end; and said one or more circuits to enable transmission to an intended recipient wireless station of the plurality of wireless stations, data frames via the first and second channels in a period following the first and second CTS to self messages, in which other wireless stations of the plurality of wireless stations refrain from transmitting in response to transmission of the first and second CTS to self messages.

18. The apparatus according to claim 17, wherein the one or more circuits to enable the apparatus to gain access to a wireless network based on the CTS to self messages without requesting access from the access point of the wireless network that also includes the plurality of wireless stations.

19. The apparatus according to claim 18, wherein the one or more circuits to enable transmission of the second CTS to self message only after completion of transmitting the first CTS to self message.

20. The apparatus according to claim 19, wherein the one or more circuits transmits data frames concurrently on the first and second channels.

* * * * *